(12) United States Patent
Aubrey et al.

(10) Patent No.: US 10,991,028 B1
(45) Date of Patent: Apr. 27, 2021

(54) PRODUCT COLLECTIONS GROUPED UNDER A SINGLE PRODUCT IDENTIFIER

(71) Applicant: Amazon Technologies, Inc., Seattle, WA (US)

(72) Inventors: Colleen Maree Aubrey, Seattle, WA (US); Kristiana Helmick, Seattle, WA (US); Jean-Luc Nahon, Seattle, WA (US); Pedro de Jesus Rodriguez Valadez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 16/017,444

(22) Filed: Jun. 25, 2018

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0641* (2013.01)

(58) Field of Classification Search
CPC .................. G06Q 30/0631; G06Q 30/0633
USPC ..................................................... 705/26, 27
See application file for complete search history.

(56) References Cited

U.S. PATENT DOCUMENTS

| | | | | |
|---|---|---|---|---|
| 8,060,414 B1* | 11/2011 | Lin | .................... | G06Q 30/0621 705/26.5 |
| 8,185,446 B1* | 5/2012 | Kuznetsova | ......... | G06Q 30/016 705/26.1 |
| 8,285,602 B1* | 10/2012 | Yi | .......................... | G06Q 30/00 705/26.7 |
| 9,589,293 B1* | 3/2017 | Yalamanchi | ....... | G06Q 30/0641 |
| 2010/0325016 A1* | 12/2010 | Marcus | ............. | G06Q 30/0643 705/27.2 |
| 2013/0132854 A1* | 5/2013 | Raleigh | ................... | H04W 4/60 715/738 |
| 2014/0279197 A1* | 9/2014 | Ainsworth, III | ... | G06Q 30/0631 705/26.7 |
| 2015/0039462 A1* | 2/2015 | Shastry | ............. | G06Q 30/0631 705/26.7 |

OTHER PUBLICATIONS

"Implementing Track and Trace," Roszkowski, Rick. Pharmaceutical Processing Advantage Business Media. (Apr. 29, 2015); Dialog #1680505634 3pgs. (Year: 2015).*

* cited by examiner

*Primary Examiner* — Robert M Pond
(74) *Attorney, Agent, or Firm* — Eversheds Sutherland (US) LLP

(57) ABSTRACT

Systems, methods, and computer-readable media are disclosed for generating and surfacing product collections having multiple products grouped under a single product identifier. Example methods may include receiving, from a user device, a request for product information and determining the product information. The product information may include at least a first product having a first product identifier. Certain methods may include determining, based at least in part on the first product identifier, a product collection. The product collection includes a group of second products and a second product identifier. The group of second products may be associated with a themed event. Certain methods may include generating a product presentation including the first product and the product collection and sending the product presentation to the user device.

20 Claims, 10 Drawing Sheets

PRODUCT COLLECTIONS GROUPED UNDER A SINGLE PRODUCT IDENTIFIER

BACKGROUND

Consumer choices for goods and services have grown exponentially in recent years. Since the advent of the internet, online shopping has continually grown in popularity, and there are currently many websites and companies providing or wholly dedicated to online shopping. Today, most online shopping is based on a search or browse framework, where consumers discover and purchase products either by searching for a desired product or product feature using various search terms, or by browsing through a collection of products having some shared characteristic of interest, or by some combination of both. Navigating the sheer number of available products using a search or browse framework can prove daunting and can ultimately discourage some customers from making purchases using these means.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
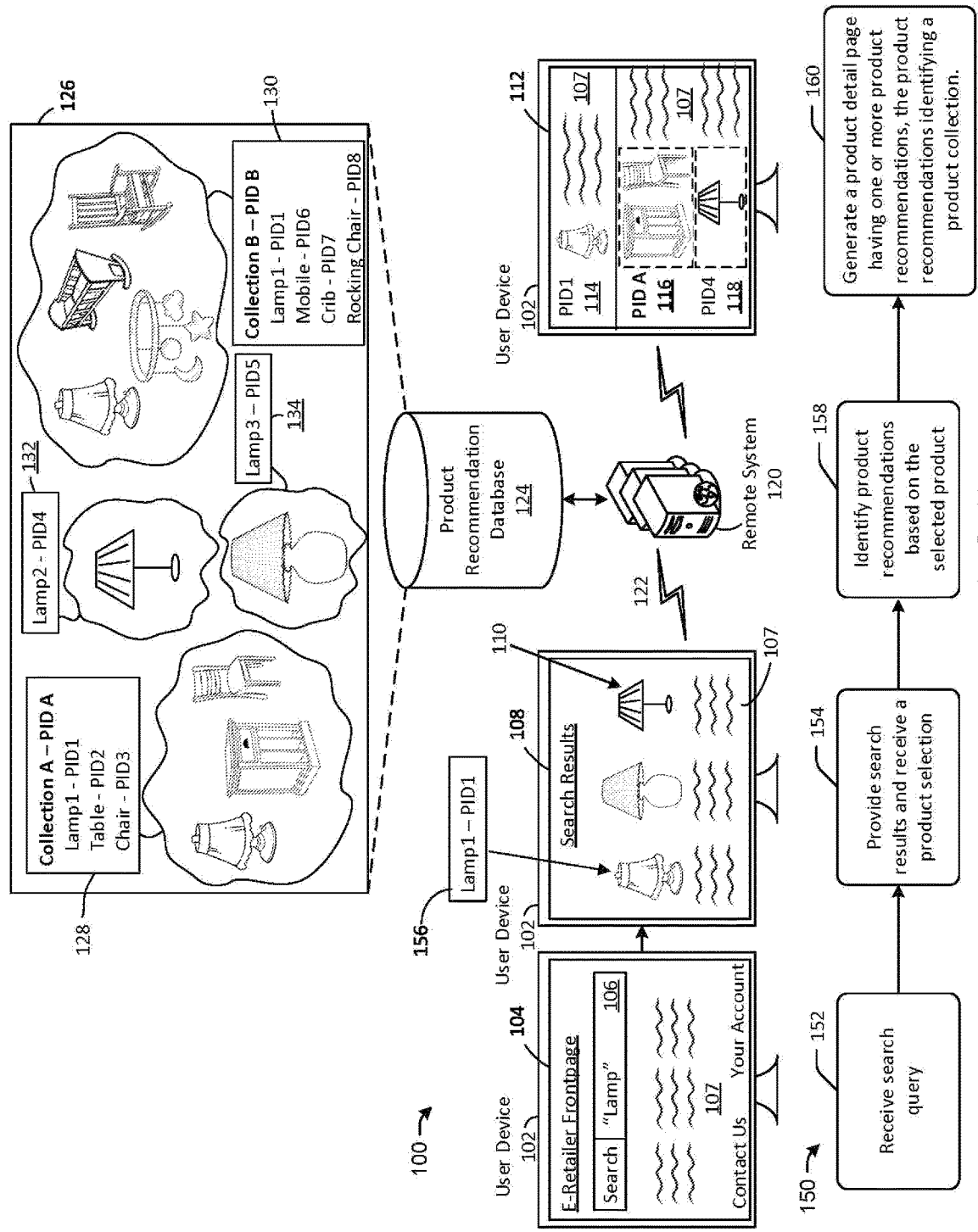
FIG. 1 is a hybrid system and process diagram illustrating the generation and surfacing of product collections in accordance with one or more example embodiments of the disclosure.

Online shopping has continually grown in popularity, and the number of available products has grown exponentially. As a result, it has become increasingly difficult for brands and advertisers to efficiently surface their desired products to consumers. Conventional search or browse frameworks, where consumers discover and purchase products either by searching for a desired product or product feature using various search terms, or by browsing through a collection of products having some shared characteristic of interest, are a primary means for surfacing products to consumers. Navigating the sheer number of available products using a traditional search or browse framework, however, can prove daunting and can ultimately discourage some customers from making purchases using these means.

Product recommendation systems have emerged to supplement search or browse frameworks, providing customers with some assistance when shopping for products, especially when these products are not physically available to the customer at the moment when a purchase, selection, or ordering decision is made. A product recommendation system may present a number of alternative items to a customer that are popular, highly rated, competitively priced, etc., so that the customer may make a more informed decision as to which product to purchase. For example, a product recommendation system may provide a consumer searching for "umbrellas" with various alternative umbrellas. This type of system can be monetized in various ways. For example, in the search framework an advertiser may pay a fee to have their branded umbrella presented to a consumer in connection with a search for umbrellas. Under the browse framework, an advertiser may pay a fee to have their own branded product prominently displayed as a featured product.

Conventional product recommendation systems and search and browse frameworks are limited to the surfacing of highly related products, such as equivalent products as well as products that are required by or used in conjunction with each other. For example, a consumer can use these systems to search or browse for a desired item (e.g., a floor lamp), and can be offered various equivalent items (e.g., other floor lamps) and various items which are used with the desired item (e.g., light bulbs) as recommendations.

Embodiments of the disclosure include devices, systems, methods, computer-readable media, techniques, and methodologies for creating and surfacing collections of complementary products associated with a particular lifestyle, event, experience, activity, purpose, or theme (collectively referred to herein as "themed events"). Product collections associated with themed events are referred to herein interchangeably as "lifestyle collections" or "product collections." Certain embodiments provide consumers with the ability to shop and otherwise interact with these lifestyle collections in much the same way as is done for a single product. For example, a user searching for a French cook book by a celebrity chef may be presented with furniture collections and/or clothing collections related to French cuisine and/or the celebrity chef. The user can then browse these collections in much the same manner as is done for individual products. By focusing on a theme or lifestyle related product group rather than on a product or on equivalents thereof, consumers are offered a new, cross-brand, cross-item, inspirational-based shopping experience and product offering beyond that provided by conventional search and browse, and that may deliver a more efficient shopping experience.

Product collections may be created by retailers, brands, advertisers, celebrities, influencers, public figures, and shoppers (collectively referred to herein as "users"). In some embodiments, users create a product collection by tagging or otherwise associating two or more products together in a product collection. Users may then request or create a single, unique product identifier for the product collection. The unique product identifier can include, for example, an Amazon Standard Identification Number (ASIN), a Universal Product Code (UPC), a European Article Number (EAN), an International Standard Book Number (ISBN), or any other type of product identifier.

In some embodiments, these product collections can be modified (e.g., personalized) and shared with others. For example, a consumer, brand, or advertiser (e.g., a user) can modify a product collection by, adding and/or removing products in the product collection, for instance, to include in the collection a product of interest to the user. When a product collection is modified, it may keep the same product identifier or it may be considered a new product collection and given a new product identifier. In some embodiments, users may be able to search product collections and add one or more favorite product collections to a scrap board associated with the user.

In some embodiments, the user can share a product collection, perhaps one they created, and/or a modified version of a product collection on various social media platforms, wherein the presentation of the product collection links back or otherwise directs the user to a platform for viewing and purchasing the product collection or products within the product collection. In this manner, consumers, brands, and advertisers can create and share their own variations of a particular product collection that highlights products of interest or importance to the consumer, brand, or advertiser. For example, a brand can create their own version of the "mid-century modern living room" by replacing some of the products of the product collection with their own merchandise, and then direct the presentation of the product collection through various platforms and mediums, such as online retail, social media, pop-up shops, etc.

In some embodiments, product collections can be customer agnostic, meaning that the product collections are surfaced to all users in the same manner. For example, a search for a modern lamp by two users would result in both users being presented with the same product collection recommendations. In other embodiments, product collections can be specific to a user. For example, a search for a modern lamp by two users could result in different recommended product collections. These differences can be a result of differences in the user accounts, such as demographic information, search histories, purchase histories, view history, or any other user metric.

Individual products can be associated with a lifestyle collection in various ways, and some products may be associated with more than one lifestyle collection. In some embodiments, complementary products are associated with a lifestyle collection. These complementary products may share, for example, a same themed event. For example, a particular ingredient can appear in any number of food related lifestyle collections, a lamp can appear in any number of living space/decoration lifestyle collections, etc. Lifestyle collections can be manually curated, automatically generated, or both. For example, manual curation may include manually editing (e.g., by a lifestyle collections designer) which products are included in a particular lifestyle collection, whereas automated curation may include the use of rules, machine learning techniques, or product analytics (e.g., product view counts, the likelihood of two or more products being purchased together, etc.) to automatically modify lifestyle collections.

In some embodiments, two or more products can be manually associated with a lifestyle collection. For example, an advertiser, brand, or retailer can create a lifestyle collection of products relating to a themed event. The manual association of products with a lifestyle collection may be referred to herein as a manual curation. This can include the selection of products from a large set of prospective products, which may be determined using search tools, machine learning, or other techniques. For example, a brand could create a lifestyle collection for a recipe that includes one or more of the brand's products, and included in the lifestyle collection may be products from other brands, for example, from other companies. These curated lifestyle collections can then be offered on a desired platform so as to target a certain group of users. For example, a food company may present a lifestyle collection including its products as ingredients on a social media platform in association with the account of a celebrity chef. In this manner, users interested in a particular influencer, or brand, can access certain lifestyle collections associated with those influencers or brands.

In some embodiments, another form of curation may be where two or more products are automatically associated with a lifestyle collection. Automatic associations can be generated using various machine learning techniques, such as, for example, supervised machine learning and unsupervised machine learning. In a supervised machine learning system, a designer will train the machine learning system (e.g., a generated adversarial network, or a neural network having one or more layers) on a large set of training data. For example, a designer can provide the system with several hundred or thousand products with manually defined lifestyle collection associations (sometimes referred to as "labeled" data). Using the training data as a starting point, the system can then generate the neural network layer coefficients that provide the most accurate mapping to the training data. Once the neural network layer coefficients are defined, the system can be applied to new products having unknown product associations.

In one embodiment, a dataset of products may be labeled with known product collection associations to produce labeled data. For example, an entry in a dataset for a metal chair can be manually labeled as belonging to a modern living room lifestyle collection and to an industrial remodel lifestyle collection. Similarly, a modern lamp can be labeled as belonging to the modern living room lifestyle collection. The labeled data can then be used generate a model for predicting product associations with product collections. In some embodiments, labeled data may be used to train a neural network to produce a first set of weighted coefficients. This first set of weighted coefficients can be used to generate estimated product collection associations. In some embodiments, the estimated product collection associations are compared against the actual product collection associations to determine a distance or an error associated with the estimated product collection associations. In some embodiments, the first set of weighted coefficients may be modified to produce a second set of weighted coefficients that reduces the distance or error. This process can be repeated over several generations to improve the predictive capabilities of the neural network. In some embodiments, the process may be repeated until a set of weighted coefficients is generated that provides a distance or error below a threshold. In some embodiments, this process may be repeated until an improvement in a distance or error between two successive generations is less than a threshold.

In comparison to a supervised machine learning system, an unsupervised machine learning system may not have the benefit of a designer or an initial training set of "labeled" data. Instead, the system infers a function that describes the structure of the unlabeled data.

In one embodiment, rules may be determined for generating a product collection. The rules may be applied to a dataset including one or more products offered by the online platform. In some implementations, the rules may define one or more conditions that, if satisfied, will trigger the association of one or more products with a product collection. These conditions can leverage known relationships among the one or more products as they relate to a lifestyle, event, experience, activity, purpose, or theme (i.e., to a themed event). These product relationships can be empirically discovered through marketplace analytics, transactional data and non-transactional data, for example, by tracking product purchases, periods of time when one or more products are purchased, user actions prior to or after a purchase, a number of likes for a product, a review score of a product, a number of views of a product. User actions can include clicking a product, navigating to a product detail page, browsing one or more products, adding a product to a cart or wish list, or any other user interaction, such as an interaction with a user interface of the online platform.

In one implementation, a condition can include a requirement that a likelihood that a set of products in an online platform will be purchased together or used together is greater than a threshold. For example, if a chair and a rug are known to be purchased together in more than 20 percent of all shopping carts, the chair and the rug can be associated with a same product collection. In another example, a condition can include a requirement that a likelihood of selecting a second product in the online platform after selecting a first product is greater than a threshold. The threshold can be a predetermined threshold that may be manually or automatically set to increase or decrease the relative ease by which one or more products in the online platform are associated with a product collection.

In one implementation, a condition can include a requirement that a likelihood that a set of products in an online platform will be purchased together or used together is greater than a threshold. For example, if a chair and a rug are known to be purchased together in more than 65 percent of all shopping carts, the chair and the rug can be associated with a same product collection. In another example, a condition can include a requirement that a likelihood of selecting a second product in the online platform after selecting a first product is greater than a threshold. The threshold can be a predetermined threshold manually or automatically set to increase or decrease the relative ease by which one or more products in the online platform are associated with a product collection.

In one embodiment, the rules may be executed against a dataset of products stored in a database to generate one or more product collections. These product collections can be updated over time based on product related data, for example, transactional data, product popularity (e.g., views, placement in shopping carts, etc.), marketing campaigns, etc. For example, a likelihood that a first product is purchased with a second product can change over time, which may trigger one or both of the products being removed from a product collection. In another example, product related data showing that a first product not in the product collection is more likely to be purchased than a second product in the product collection can result in a replacement of the second product with the first product in the product collection. In another example, a first product can be removed from a product collection in response to product related data showing that the first product is no longer likely to be purchased with other products in the product collection (e.g., the likelihood is known to be below a threshold). In other example, a first product can be added to a product collection in response to product related data showing that the first product is now likely to be purchased with other products in the product collection. In one embodiment, product collections are updated in response to changes in user activity. For example, a first product in a product collection can be replaced with a second product based at least in part on a number of product views of the first product or a number of product views of the second product. In one implementation, the number of product views of the first product and the second product are compared. If the number of product views of the second product is higher than the number of product views of the first product the first product may be replaced with the second product. In another example, a product can be added to a product collection if the product is found to be purchased at a high conversion rate following a search, browse or other interaction (e.g., an advertisement) with the product collection.

In some embodiments, two or more products may be added to a product collection using a combination of machine learning and curation. For example, a machine learning system can generate an initial product collection that may be then manually or automatically curated by a designer. Alternatively, a product collection that was manually generated can rely on machine learning for future updates. In some implementations, curating the product collection comprises manually removing a product from the product collection, or manually adding a product to the product collection. Further, one or more products may be removed and/or added to the product collection automatically.

In one embodiment, one or more products offered by an online platform are associated with a particular themed event. This association can be stored, for example, as an entry in a database of the online platform. In this manner, the database can be searched to identify one or more products having a same or similar lifestyle, event, experience, purpose, or theme of a first product, or searched to identify one or more products associated with an identified lifestyle, event, experience, purpose, or theme.

In some embodiments, automatic associations are based in part on leveraging known relationships between the products. In some embodiments, automatic associations are based in part on known customer behaviors. These product relationships and customer behaviors can include knowledge that a first product and a second product are often purchased together. For example, if the first product is purchased, the likelihood of the second product also being purchased may be known to satisfy (e.g., be equal to or greater than) a threshold. This threshold can be tuned (increased or decreased) to adjust the number of automatic associations. Product relationships and customer behaviors can include knowledge that a first product and a second product are often purchased within a particular period of time of one another. For example, customers purchasing a first product are highly likely (e.g., in greater than 70% of cases) to purchase a second product within a period of time. This period of time could be, for example, a same visit, within a day, within a week, or within any other period of time. Product relationships and customer behaviors can also include knowledge that two products are often used together. For example, a first product and a second product can be used together in a recipe or in a home repair project.

In some embodiments, lifestyle collections are provided a single unique product identifier (e.g., a universal product code (UPC), an Amazon Standard Identification Number, commonly referred to as an ASIN, etc.) representing the entire lifestyle collection. In this manner, the product identifier for the product collection can be used to surface the product collection to users through conventional product recommendation systems and search and browse frameworks in much the same manner as a product identifier for a single product may be used. For example, a product identifier for a particular lifestyle collection can be utilized just as a single product identifier might be used, such as in a search or browse activity, as a product recommendation, or as a tile on a storefront. In some embodiments, recommendations for lifestyle collections are intermingled with those of single products, while in other embodiments recommendations for lifestyle collections only include these collections. In either case, the selection of what lifestyle collections to present to a user may be substantially similar to the selection of individual products, and may be based on, for example, popularity, transitional data, ad campaigns, etc.

Advantageously, the product identifier for a particular lifestyle collection can similarly flow through a platform in the same manner as a product identifier for a single product. For example, the product identifier for a particular lifestyle collection can be used to surface the product collection to users at a gateway page, a product detail page, a search page, or anywhere else a single product identifier can be surfaced to users. As used herein, the term surfacing is meant to include any manner of connecting a user to a product. For example, surfacing a product could include, but is not limited to, providing data for displaying the product on a user device, providing an audible recommendation for the product to a user, providing the product as a search result, or as an advertisement, placing the product in a browsed list, or any other way in which a product can be brought to the attention of a user.

As discussed previously herein, a lifestyle collection can include multiple products grouped under a single product identifier. In some embodiments, the product identifier of a lifestyle collection may be associated with, for example, mapped to, the individual product identifiers of the products in the lifestyle collection. For example, a mid-century living room lifestyle collection that includes a chair, a sofa, a lamp, and a rug will have its own product identifier for the lifestyle collection, and the respective products in the lifestyle collection will have their own respective product identifiers. In this manner, a user may select to purchase the lifestyle collection, that is, all the products in the collection, using the single product identifier for the collection, which may be used for an executable user interaction. A user may also interact with individual products that are presented as the lifestyle collection.

The generation and surfacing of lifestyle collections can greatly improve the user's experience. For example, a user searching for a particular lamp may not be interested in recommendations for six additional lamps, which is a common occurrence when using traditional search and browse. Using a lifestyle collection-based approach, the user may instead presented a list of recommended products that are complementary to, rather than alternatives to, the lamp. For example, the user can be provided a recommendation for an interior decoration lifestyle collection that includes the lamp, a matching lampshade, a rug, and an end table.

In some embodiments, a set of tiered lifestyle collections can be recommended to a user to further improve the user experience. In some implementations, product collections tiers may be split into various groups (e.g., good, better, best). In some implementations, product collections represent various price points. In a fashion context, for example, a user search for a particular outfit or for a fashion-related product collection may result in three related outfits at three different price points. In this manner, a user can choose between several related product collections based on a budget or other requirement.

In some embodiments, a remote system (e.g., a remote server) of an online platform (e.g., an online marketplace) may determine a themed event associated with a user's search, browse, or selection of a product. For example, the search for a particular piece of furniture can be associated with a living room remodel. In some embodiments, the remote system may recommend a product collection that is also associated with the same themed event as the product. For example, in a scenario where a user searches for a waterproof camera, or adds a waterproof camera to a shopping cart, the remote system may determine that the user is likely to be going on a water-based excursion in the near future. The remote system can then recommend one or more product collections associated with a water-based excursion, such as a beach vacation product collection. In some embodiments, user information, such as a search or purchase history, can be used by the remote system to infer a themed event of the product. For example, the remote system can search the interaction history of a user to determine that the user has previously bought one or more products of a particular product collection. In one scenario, a product collection can be recommended to a user who has previously bought a threshold number of the products in the product collection.

As discussed previously herein, associating a product collection with a single product identifier advantageously allows for a product collection to be surfaced to users in the same way as other, individual products (e.g., in the same way single items are surfaced to users during a search or browse, or when providing content). In some embodiments, the product identifier for a product collection can flow through automated user interaction systems and sponsored product systems in the same way as a product identifier for a single product.

In some embodiments, a product collection may be surfaced to a user on a product detail presentation following a selection of a related product by the user while searching or browsing. A product detail presentation can include, for example, a web page, an audible exchange, etc. In one scenario, for example, an online platform or website can be accessed by a user device. Online platforms provide a means for selling products and services over the Internet. These online platforms offer a wide variety of products and services to customers of all sorts, providing the convenience of acquiring products from a single place, such as the home.

Online platforms help drive new business for online vendors by providing benefits of increased user interaction by improving user access to the products and other content. Online platforms can be maintained directly by the vendors manufacturing the products, or can be maintained by third party owners. The user device may include any suitable computing device capable of receiving, transmitting, and/or generating data including, but not limited to, a mobile device such as a smartphone, tablet, e-reader, wearable device, or the like; a desktop computer; a laptop computer; a content streaming device; a set-top box; or the like.

In one embodiment, the user can navigate the online platform using a web browser on the user device to search, browse, or otherwise discover products to purchase. The online platform can include, for example, search and browse functionality for filtering and surfacing particular products offered by the online platform to the user. In one implementation, the user can enter a search string into a search box of a user interface of the online platform, and in response, the online platform can surface one or more products related to the search string. For example, a user can enter "modern lamp" into a search box, and the online platform can return one or more items relating to a modern lamp.

In one embodiment, the search string may be received over a network by a remote system for processing. The remote system may include any suitable computing device capable of receiving, transmitting, and/or generating data, such as, for example, a remote server, computer(s), or a cloud platform or service. In some embodiments, the remote system may be communicatively coupled to a database.

In some embodiments, the database can include product identifiers associated with products offered on the online platform. In some implementations, each product available for interaction on the platform may be associated with a unique product identifier which is stored in the database. The unique product identifier can include, for example, an Amazon Standard Identification Number (ASIN), a Universal Product Code (UPC), a European Article Number (EAN), an International Standard Book Number (ISBN), or any other product identifier.

In some embodiments, a unique product identifier may be assigned to the product when the product is added to or otherwise registered with the database. The product identifier uniquely identifies the product and associates it with a database record containing, for example, a description and name for the product, a type identifier for the product, and a URL or other pointer to a location where the product or more information about it may be obtained, such as a landing page or a product detail page.

In one embodiment, a remote system of the online platform receives the search query and determines a search result having one or more products associated with the search query. For example, in response to a search query for a "modern lamp," the remote system can determine and return a search result having one or more products associated with a modern lamp. In some implementations, the search result can include one or more product collections. For example, in response to the search query for a "modern lamp," the remote system can determine and return a search result that includes a product collection related to modern lamps. For example the product collection may be an modern home product collection that include other modern furniture such as a couch, chairs, end tables, etc., or it may be a home office design product collection that includes other furnishing for a home office such as a copier, stapler, etc.

In some embodiments, a user device may present to a user the products and product collections sent to the user device in response to the search result, and the user device can receive a user selection a product and/or product collection, and in response send a request for additional information. For example, a search for a "modern lamp" can return a search result of one or more lamps, one or more products associated with lamps (e.g., light bulbs), and one or more product collections associated with modern lamps (e.g., a modern remodel product collection). A user can review the search result and can select any of the products or product collections for additional information.

In some implementations, clicking on or otherwise selecting one of the search results may cause the user device to send a request for a product detail page associated with the selected item. In some embodiments, a remote system of the online platform receives an indication of the selection of a product from the user device. In response, the remote system can identify one or more products related to the selected product. In some embodiments, the related products may include one or more a product collection having multiple products grouped under a single product identifier.

In some embodiments, the remote system can generate a product detail page that includes the related products and product collections. The product detail page can be sent or otherwise presented to the user device. For example, a selection of a particular brand's "macaroni noodles" in a search result can a product detail presentation for these macaroni noodles to be sent to the user device. The product detail presentation can include a recommendation for a celebrity chef's Macaroni au Gratin recipe product collection.

The user can review any of the recommended products or product collections presented on the product detail page. In some embodiments, a remote system of the online platform receives an indication of a selection of a product collection provided to the user device, such as a recommendation on the product detail page. For example, a user may select the recommendation for a particular celebrity chef's Macaroni au Gratin recipe product collection.

In some embodiments, selection of a product collection can result in the generation and presentation of a product detail page or landing page of the selected product collection. In some embodiments, the product detail page of the product collection includes a presentation of two or more products that have been grouped together under the single product identifier of the product collection.

In some embodiments, the product detail page of the product collection may include a list of product recommendations. In some embodiments, the product detail page may include one or more photographs showing some or all of the products of the product collection. The photographs can be interactive, or tagged, allowing for the selection of one or more products within the photograph to obtain additional product information about the product. Selection of one of the products in the photograph can result in to the generation and sending of a product detail page associated with the selected product to the user device. In some embodiments, each product in the product collection may be tagged with respective individual product identifiers. In some embodiments, a stock image or photograph of a product collection can be modified by a user. For example, a user may move, remove, resize, recolor, reshape, or otherwise modify any of the images in a product collection photograph. In another example, a user could drag and drop one or more additional images into the product collection photograph.

In some embodiments, the product detail page of the product collection may be a virtual room having each of the products of the product collection. This virtual room can be user navigated, and products in the virtual room can be moved, removed, or modified as desired. In some embodiments, a user can resize, recolor, reshape, or otherwise modify products in the virtual room. In some embodiments, products in the virtual room can be replaced by the user with alternative products. These alternative products can themselves be recommended alternative items (e.g., sponsored content) or can be products manually identified and inserted into the virtual room by the user. In some embodiments, the user can add one or more additional products to the virtual room, for example, by copying and pasting an image of the product into the virtual room.

In some embodiments, the product detail page of the product collection can include a recommendation for a substitute product for one or more products of the product collection. For example, a brand or advertiser can have the online platform present its product as a recommendation or as a related alternative to one of the products in the product collection. In this manner, the product collection can include one or more advertised products.

In some embodiments, a product collection can be surfaced to a user in response to receiving an image of a product. For example, user may take an image of a particular dress and, in response, a recommendation system may complete an image search of a database for one or more product collections matching the dress. The dress may be a part of one or more of the product collections, or alternatively, the dress may be associated with a same themed event as one or more of the product collections. For example, an image of a wedding dress may result in a recommendation for various wedding-based product collections.

In some embodiments, a remote system of the online platform can apply one or more rules to determine what product collections a product may be included in or presented as an alternative or substitute product. For example, if the original product was an organic macaroni, an advertiser's or brand's desired product would also need to be a macaroni (or even an organic macaroni).

Referring to FIG. 1, an example use case 100 for generating and surfacing product collections in an online platform is depicted in accordance with one or more example embodiments of the disclosure. As illustrated in FIG. 1, a user device 102 can receive and display various user interfaces of the online platform to a user, such as an online platform landing page 104 having a search interface 106, a search results interface 108 having one or more search results 110, and a product detail page 112 having a selected product 114, a recommended product collection 116, and a recommended product 118. The search interface 106 is depicted as having three search results and the product detail page 112 is depicted as having two recommendations for ease of illustration. It is understood, however, that the various interfaces of the online platform can include more or less details, such as any number of additional search results and recommendations. Moreover, while the use case 100 is discussed in the context of an internet-based solution, the generation and surfacing of product collections is equally applicable to other formats, such as an audio-based platform.

In some embodiments, the user device 102 can interface with a remote system 120 over a networked connection 122. The remote system 120 can be configured to interface with the user device 102, and can include, for example, one or more remote servers and databases. The networked connection 122 can include, but is not limited to, one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks.

In some embodiments, the remote system 120 can be further configured to interface with a product recommendation database 124. The product recommendation database 124 can include, for example, one or more remote servers and one or more databases. In some embodiments, the remote system 120 and the product recommendation database 124 are part of the same system. In other embodiments, the remote system 120 and the product recommendation database 124 may be different systems.

In some embodiments, the product recommendation database 124 can include a product dataset 126. The product dataset 126 can include, for example, one or more products and one or more product collections. As described previously herein, the products and product collections can be assigned respective unique product identifiers. In some embodiments, the product collections can include a group of second products associated with a themed event of a first product. As depicted in FIG. 1, the product dataset 126 includes a first product collection 128 ("Collection A" having product identifier "PID A"), a second product collection 130 ("Collection B" having product identifier "PID B"), a first product 132 (a "Lamp2" having product identifier "PID4"), and a second product 134 (a "Lamp3" having product identifier "PID5"). While illustrated as having two product collections and two products for ease of illustration, it is understood that the product dataset 126 can include any number of products and product collections.

In some embodiments, a product collection also may include, in addition to the product collections, the individual product that are in the product collection, each with a unique product identifier that is different from the product identifier of the product collection to which they belong. For example, the product collection "Collection A" includes the product identifiers "PID1," "PID2," and PID3," associated with the respective "Lamp1," "Table," and "Chair" of the collection. The product collection "Collection B" includes the product identifiers "PID1," "PID6," "PID7," and PID8," associated with the respective "Lamp 1," "Mobile," "Crib," and "Rocking chair" of the collection.

To generate and surface product collections on an online platform, an example process flow 150 is presented and may be performed, for example, by the remote system 120. The remote system 120 may include at least one memory that stores computer-executable instructions and at least one processor configured to access the at least one memory and execute the computer-executable instructions to perform various actions or operations, such as one or more of the operations in the process flow 150 of FIG. 1.

At a first block 152, the remote system 120 may receive an indication of a search query received at the landing page 104. In some embodiments, a user can interact with the search interface 106 to initiate a search for one or more desired products. For example, a user can use the search interface 106 to search for a "Lamp."

At block 154, the remote system 120 may present the search results 110 generated by the remote system 120. This may include the remote system 120 searching the product dataset 126 to determine related products and product collections. The product results are sent to the user device 102 for presentation. The user may receive a selection of a product 156, with a product identifier PID1. As depicted in FIG. 1, the remote system 120 provides three search results, and receives a product selection 156 for the product "Lamp1" having a product identifier "PID1." In one embodiment, the remote system 120 may determine the search results 110 in response to receiving the search query for a "Lamp."

In one embodiment, the remote system 120 can determine and provide a search result having one or more products. In some implementations, the search results 110 can include one or more product collections, each assigned a single product identifier. For example, in response to the search query for a "Lamp," the remote system 120 can determine and return a search result that includes one or more products (e.g., lamps), as well as one or more product collections having one or more items associated with a lamp (e.g., another product from a product collection having a lamp).

At block 158, the remote system 120 may identify one or more recommendations based on the product selection 156. In some embodiments, the remote system 120 accesses the product recommendation database 124 and the product dataset 126 is searched for products and product collections related to the product selection 156. As depicted in FIG. 1, the product dataset 126 may return four results based on the product selection 156, for example, the "Collection A," the "Lamp2," the "Lamp3," and the "Collection B."

One or more recommended products and one or more recommended product collections related to the product selection 156 can be identified according to one or more embodiments of the present disclosure. In some embodiments, the product dataset 126 may be searched for product collections having the product of the product selection 156. In some embodiments, the remote system 120 may determine the product collections that are related to a the product of the product selection 156, that is, where the product of the product selection 156 is related to a lifestyle, event, experience, purpose, or theme of one of the product collections in the product dataset 126. In some embodiments, consumer information, such as a search or purchase history, can be used by the remote system 120 to infer a lifestyle, event, experience, purpose, or theme associated with the product selection 156. In some embodiments, the remote system 120 may recommend a product collection that is related or associated with the same lifestyle, event, experience, purpose, or theme as the product of the product selection 156.

At block 160, the remote system 120 may generate the product detail page 112 for the product of the product selection 156. The product detail page 112 may include the recommended product collection 116 and the recommended product 118. In some embodiments, the product detail page 112 can be sent to the user device 102 where it can be presented. As depicted in FIG. 1, the product detail page 112 includes two recommendations for ease of illustration: the recommended product collection 116 having a product identifier "PID A" and the recommended product 118 having a product identifier "PID4." It is understood, however, that the product detail page 112 can include any number of recommendations.

Example embodiments of the disclosure provide a number of technical features or technical effects. For example, in accordance with example embodiments of the disclosure, certain embodiments of the disclosure may receive and process search queries against one or more databases, automatically infer a themed event related to the search query or a product interaction (e.g., a selection, a click, a hover, an add to cart), and identify and generate for presentation a product collection having a single product identifier that is related to the inferred themed event. In another example, certain embodiments of the disclosure may provide an unexpected presentation of products in a collection beyond that available using conventional processes. In some implementations, the recommended product collection can include products of a different type than the original product which prompted the recommendation. In other words, a first product (e.g., a searched or otherwise indicated product) may be of a first type, and the recommended product collection may include one or more products of a second type. For example, a user search for sun screen may result in the surfacing of a travel-themed product collection including various pieces of luggage, towels, etc., because the user is likely going on a trip. In another example, a user browsing through cookbooks may be presented with furniture associated with the cuisine or author of the book. As a result, an improved search and browse functionality is provided in which products are effectively surfaced to a user that would likely not have been sent to the user device for presentation using conventional search and browse, which is typically limited to the identification of products directly related to one another as, for example, a replacement product, a consumable for a product, etc. Moreover, providing a single product identifier for a product collection enables users to engage in a single user interaction or executable action directly with the entire product collection. In other words, a single product identifier for a product collection can be leveraged to allow for user actions to be taken on all of the products of the product collection simultaneously. For example, a user could add all of the products of a product collection to a cart based on the product identifier of the product collection. Similarly, a user could buy, like, rate, or take any other action against the product collection as a whole based on the product identifier of the product collection.

Embodiments of the disclosure may improve computing efficiency by reducing the number of searches against a database that are required to locate a desired product, thereby reducing the database load associated with traditional search and browse. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

ILLUSTRATIVE PROCESS AND USE CASES

Figure 2:
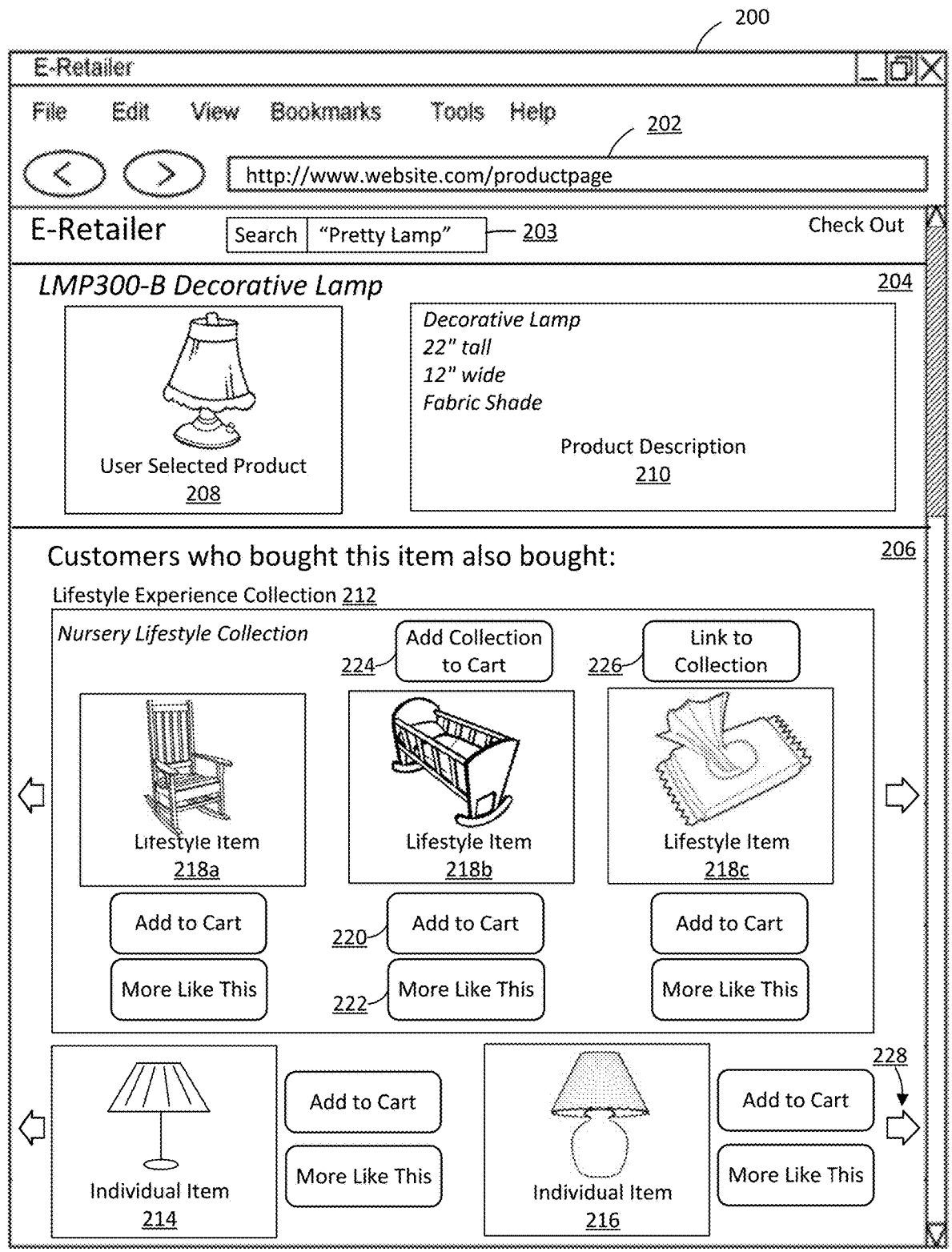
FIG. 2 is a schematic illustration of an example product detail page for surfacing product collections in accordance with one or more example embodiments of the disclosure.

FIG. 2 depicts an example product detail page 200 for surfacing product collections in accordance with one or more example embodiments of the disclosure. While example embodiments of the disclosure may be described in the context of a product detail page, it should be appreciated that the disclosure is more broadly applicable to all means of surfacing products to consumers. For example, product collections can be surfaced via a search interface, a browse interface, a shopping cart interface, an advertisement, a widget on an interface, a verbal or audio-based cue, or through any other interface or workflow used to surface traditional products to consumers.

As illustrated in FIG. 2, the product detail page 200 includes a uniform resource locator (URL) 202, a search widget 203, a main product widget 204, and a recommendation widget 206. In some embodiments, the search widget 203 may be used to navigate to a search results page having one or more recommended products and product collections. In some embodiments, the product detail page 200 may be displayed in response to a user selection of a user selected product 208. In another embodiment, the product detail page 200 may be displayed in response to a search query. In yet another embodiment, the product detail page 200 may be displayed in response to a user interaction with an advertisement for the user selected product 208.

The main product widget 204 includes a product description 210 of the user selected product 208. In some embodiments, the main product widget 204 includes an image, product details, a price, an availability, product reviews, and product ratings of the user selected item 208. For example, the main product widget 204 includes a product title ("LMP300-B Decorative Lamp") and the product description 210 for a "Decorative Lamp—22" tall, 12" wide, Fabric Shade."

Figure 3:
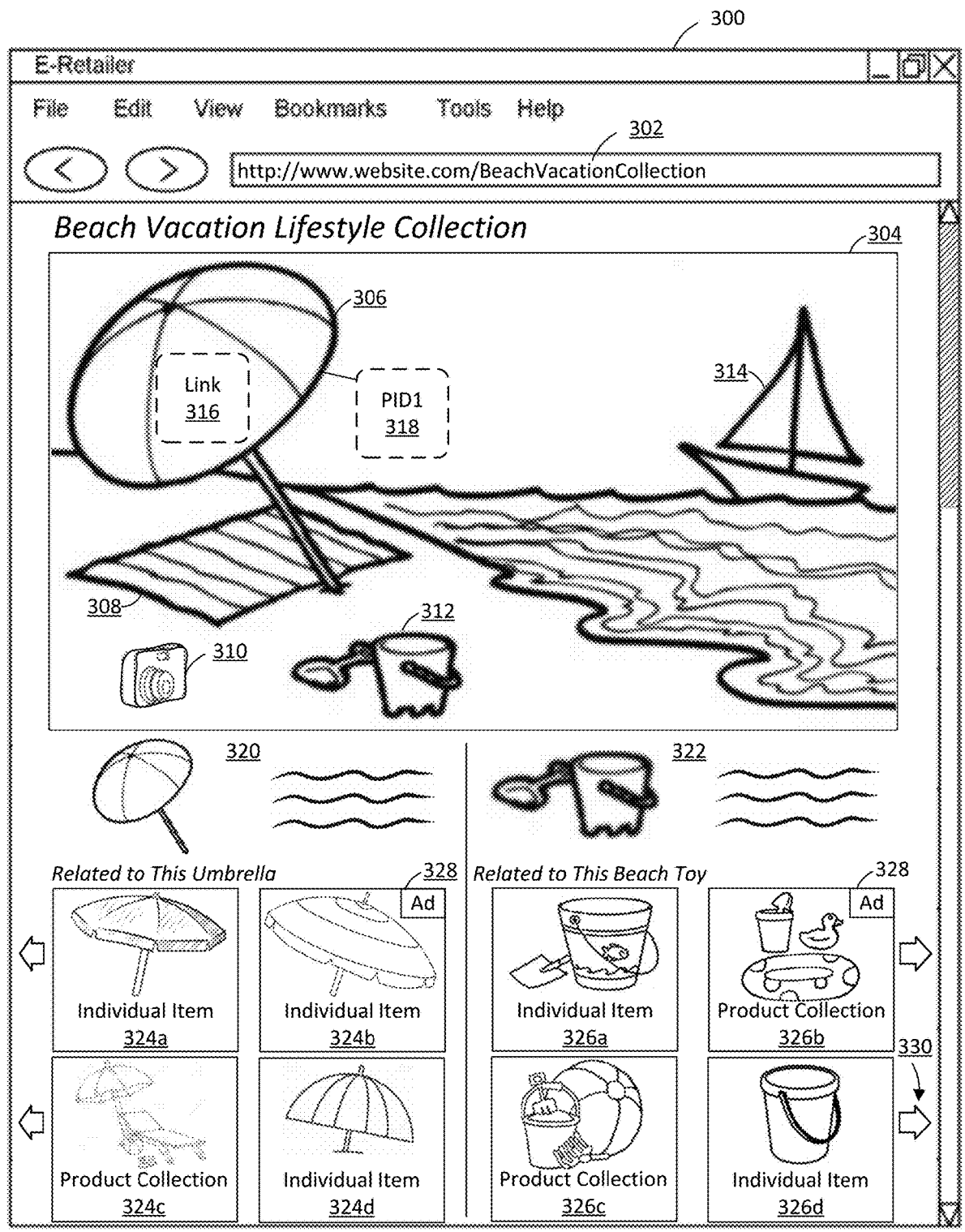
FIG. 3 is a schematic illustration of an example product detail page for a product collection in accordance with one or more example embodiments of the disclosure.

In one embodiment, the recommendation widget 206 may include one or more recommended products and one or more recommended product collections. For example, the particular recommendation widget 206 in FIG. 2 includes a recommended product collection 212, a recommended product 214, and a recommended product 216. While the recommendation widget 206 is depicted as surfacing separate images of individual products which make up a collection (e.g., the lifestyle items 218a, 218b, and 218c depicting a chair, a crib, and baby wipes, respectively) it is understood that the recommendation widget 206 may, in addition to or in lieu of separate images, surface a single composite lifestyle image according to one or more embodiments. For example, a single lifestyle image can include one or more of the products associated with the lifestyle collection, in a similar manner as the product collection image(s) 304 depicted in FIG. 3. In other words, the lifestyle items 218a, 218b, and 218c may be depicted as part of a single image. For example, the chair, crib, and baby wipes may be depicted in a nursery scene. In some embodiments, bringing a mouse cursor or other pointer over one of the images of a product in the composite image may result in the generation and display of additional information associated with the product, such as a link to a product detail page associated with the respective product or a pop-up displaying additional information for one or more products in the product collection. In some embodiments, a user may click or otherwise select the composite image to be directed to a product collection detail page associated with the product collection depicted in the composite image (e.g., the product detail page 300 for the Beach Vacation Lifestyle Collection, as depicted in FIG. 3).

The recommended product collection 212 includes a description ("Nursery Lifestyle Collection") and three products, the lifestyle items 218a, 218b, and 218c. In one embodiment, each of the lifestyle items 218a, 218b, and 218c and the recommended products 214 and 216 includes a widget 220 for adding the respective product to a cart and a widget 222 for directing a user to alternative products for the respective product. In some embodiments, the recommended product collection 212 also includes a widget 224 for adding the entire collection to a cart and a widget 226 for navigating to a product detail page of the recommended product collection 212 (e.g., the product detail page depicted in FIG. 3). In some embodiments, the recommendation widget 206 also includes a scroll widget 228 that, when selected, may show additional recommendations.

The particular recommended product collections presented via the recommendation widget 206 can be identified and surfaced according to one or more embodiments of the disclosure. In some embodiments, a remote system (such as the remote system 120 in FIG. 1) accesses a product recommendation database (such as the product recommendation database 124 in FIG. 1) to search for one or more product collections related to the user selected product 208.

One or more recommended products and one or more recommended product collections related to the user selected product 208 can be identified according to one or more embodiments of the present disclosure. In some embodiments, a product dataset (such as the product dataset 126 in FIG. 1) is searched for any product collections that include the user selected product 208. In some embodiments, a remote system may determine a lifestyle, event, experience, purpose, or theme associated with the user selected product 208 and product collections are surfaced that share a same or a related to a lifestyle, event, experience, purpose, or theme as the user selected product 208. In some embodiments, consumer information, such as a search or purchase history, can be used by a remote system to infer a lifestyle, event, experience, purpose, or theme associated with the user selected product 208.

FIG. 3 depicts an example product detail page 300 for a product collection in accordance with one or more example embodiments of the disclosure. While example embodiments of the disclosure may be described in the context of a product detail page having an annotated image, it should be appreciated that the disclosure is more broadly applicable to all means of surfacing products to consumers. For example, the product detail page can include a virtual room for surfacing products, a list of products, or any other arrangement of products.

The product detail page 300 can be surfaced to a user through various workflows. In some embodiments, the product detail page 300 may be generated by a remote system (e.g., the remote system 120 of FIG. 1) and sent to a user device (e.g., the user device 102 of FIG. 1) to be displayed in response to a user selection of one of the products in the product collection. For example, a user shopping, searching or browsing for a particular piece of clothing may select (e.g., click, hover over, gesture, or otherwise indicate) the piece of clothing and, in response, the user may be directed to one or more product detail pages for one or more product collections that include the piece of clothing.

In some embodiments, a user can search, browse, or otherwise interact directly with a product collection. For example, a user can search for a specific product collection, such as, "modern living room by celebrity designer Alfred," and be immediately directed to a product detail page for the indicated product collection. Once the product detail page for the product collection is surfaced, the user may then browse or otherwise look through the product collection for one or more products of interest.

In some embodiments, a user search may be related to a themed event. The themed event can be used to surface a product collection. For example, a user search for a "$50^{th}$ birthday party for mom" may result in one or more product recommendations related to a birthday, a specific birthday year (e.g., a $50^{th}$ birthday), mothers, etc., or a combination thereof.

As illustrated in FIG. 3, the product detail page 300 may include a URL 302 and one or more product collection image(s) 304. The product collection image 304 may depict the product in the product collection associated with the product collection image 304. The products in the product collection include an umbrella, beach towel, camera, bucket and toy boat. While each product in the product collection may have an associated product identifier, the product collection also has a separate product identifier to the group of products in the product collection. The product collection image 304 may depict the product in the product collection associated with the product collection image 304. As illustrated in FIG. 3, the product collection image 304 may include an image 306 for an umbrella, an image 308 for a beach towel, an image 310 for a camera, an image 312 for a bucket, and an image 314 for a toy boat.

In some embodiments, the images in the product collection image 304 may be user intractable widgets. For example, in some embodiments a user selection of any of the images in the product collection image 304 may result in the navigation of a user interface of a user device to a product detail page (e.g., the product detail page 200 in FIG. 2) associated with the respective product. In some embodiments, bringing a mouse cursor or other pointer over one of the images may result in the generation and display of a link widget 316. Selection of the link widget 316 may result in the navigation of the user interface to a product detail page associated with the respective product. In some embodiments, bringing a mouse cursor or other pointer over one of the images may result in the generation and display of a product identifier widget 318. The product identifier widget 318 may display the respective product identifier of the highlighted product.

In some embodiments, the images can be manipulated using the user interface. For example, the images can be moved, resized, recolored, or otherwise modified within the product collection image 304, or deleted entirely from the product collection image 304. In some embodiments, a user can search for and add images of new products to the product collection image 304. In this manner a user can personalize a product collection. In some embodiments, a personalized product collection may be provided a new, unique URL for easy sharing and access. In some embodiments, a personalized or standard product collection can be pinned or otherwise saved to a user account for later access.

In some embodiments, the product detail page 300 includes additional product details for one or more products in the product collection. As illustrated in FIG. 3, the product detail page 300 includes additional product details 320 related to the image 306 of the umbrella and additional product details 322 related to the image 312 of the bucket. The additional product details can include, for example, an image of the product and a product description of the product.

In some embodiments, the additional product details includes one or more alternative products, such as the individual items 324a, 324b, and 324d and the product collection 324c related to the image 306 and the individual items 326a and 326d and the product collections 326b and 326c related to the image 312. The one or more alternative products can be surfaced according to one or more embodiments of the present disclosure. For example, the individual items 324a, 324b, and 324d and the product collection 324c may be recommended products and product collections for the umbrella. Similarly, the individual items 326a and 326d and the product collections 326b and 326c may be recommended products and product collections for the bucket.

In some embodiments, any of the alternative products can be selected to provide additional information about the selected product. In some embodiments, selection of an alternative product may cause the user interface to navigate to a product detail page of the product. In some embodiments, one or more of the alternative products may be surfaced as advertised alternatives. In some embodiments, alternative products that are advertisements may be indicated as such using an advert widget 328. In some embodiments, the additional product details can include a scroll widget 330 that, when selected, may show additional alternative products.

As illustrated in FIG. 3, some or all of the alternative products can themselves be product collections. For example, the alternative products 324c, 326b, and 326c are product collections. In some embodiments, selection of an alternative product collection may cause the user interface to navigate to a product detail page of the product collection, in the same manner as for a single product.

In some embodiments, the product collection image 304 may be a virtual room containing each of the products of the product collection. This virtual room can be user navigated, and products in the virtual room can be moved or removed as desired. In some embodiments, products in the virtual room can be replaced by the user by alternative products. These alternative products can themselves be recommended alternative items (e.g., sponsored content) or can be products manually searched for and inserted into the virtual room by the user.

Figure 4:
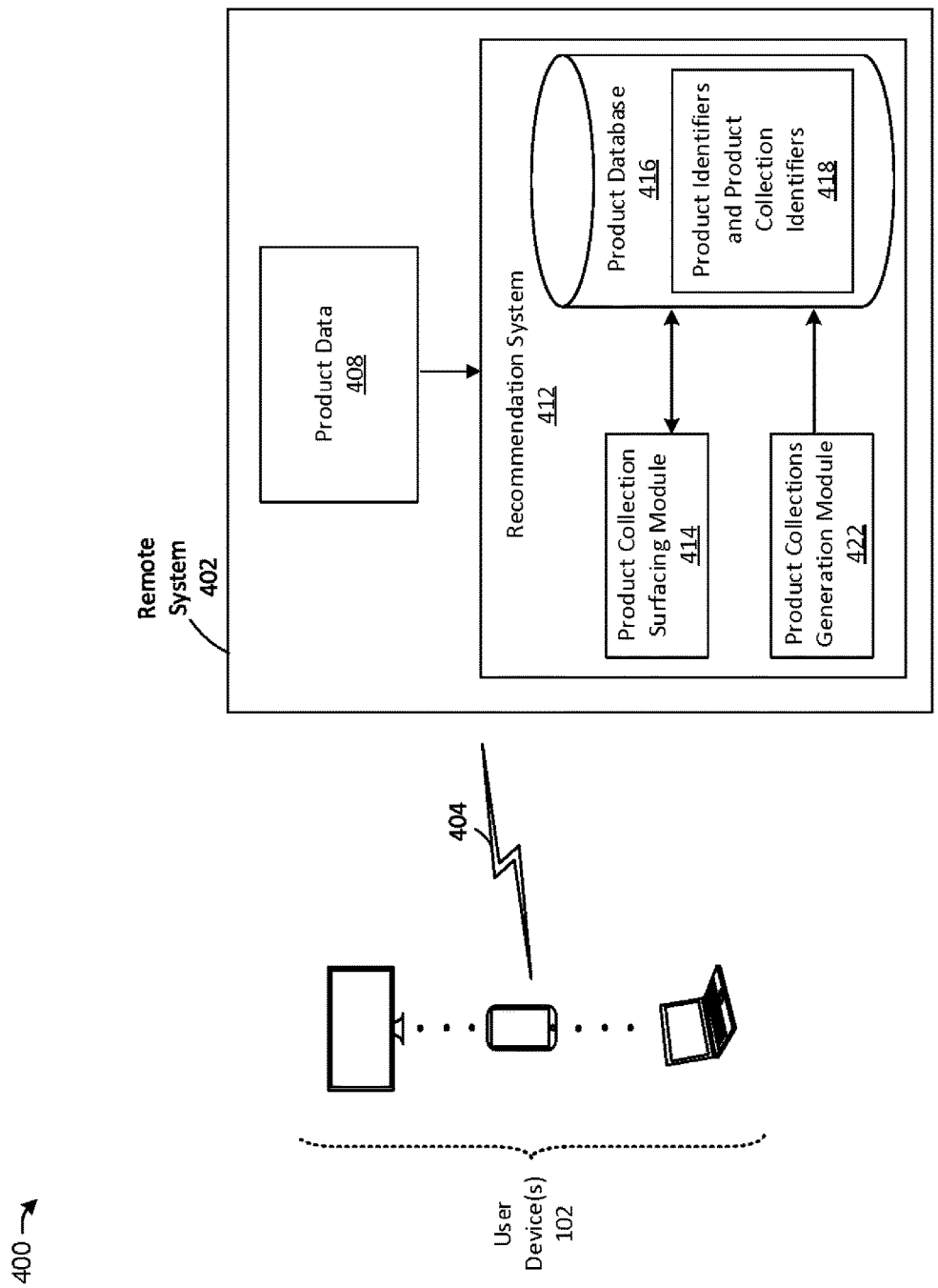
FIG. 4 is a schematic illustration of a system for the generation and surfacing of product collections in accordance with one or more example embodiments of the disclosure.
Figure 9:
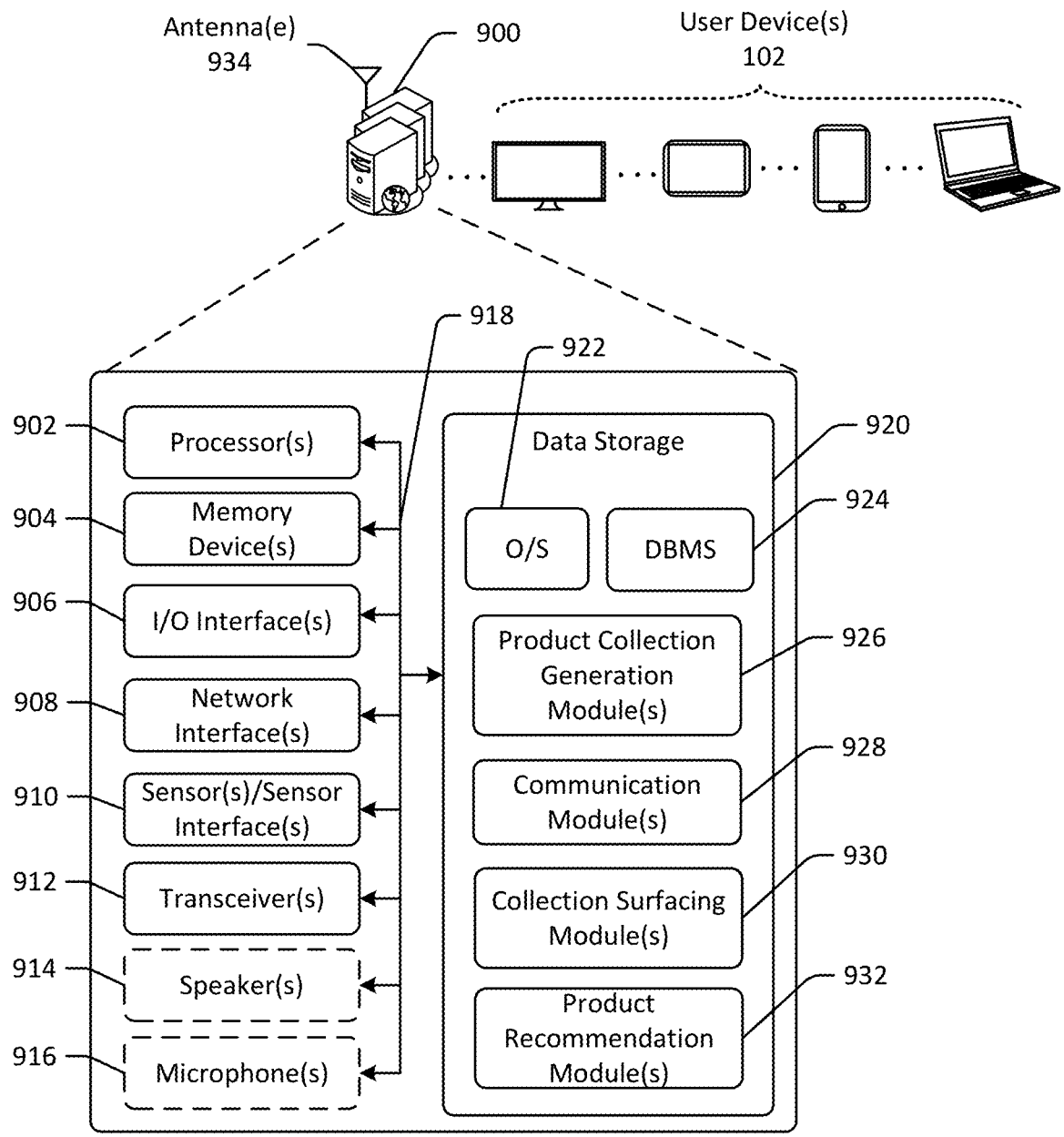
FIG. 9 is a schematic block diagram of an illustrative device in accordance with one or more example embodiments of the disclosure.

Referring to FIG. 4, an example use case 400 for generating and surfacing product collections in an online platform is depicted in accordance with one or more example embodiments of the disclosure. As illustrated in FIG. 4, a user device 102 can be communicatively coupled to a remote system 402, according to one or more embodiments of the disclosure, such as remote system 120 of FIG. 2. In one embodiment the user device 102 and the remote system 402 may be coupled through a networked connection 404. The remote system 402 may comprise one or more computers or servers in communication with one another, similar to the configuration of the remote server 900 (FIG. 9). For illustrative purposes, the discussion of the remote system 402 is directed to the recommendation system.

In some embodiments, the product data 408 may be provided to a recommendation system 412 for generating a search results presentation. The recommendation system 412 may be configured to access the product database 416 having product identifiers and product collection identifiers 418 for generating product recommendations and/or one or more product collection recommendations, such as by the product and collection surfacing module 414. In some embodiments, the product surfacing module 414 of the recommendation system 412 may search a product database 416 having individual product identifiers and product collection identifiers 418. In some embodiments, the product surfacing module 414 also may access the product data 408 for images for one or more of the product collections. As discussed previously herein, products and product collections can be related by a same lifestyle, event, experience, purpose, or theme.

In some embodiments, the recommendation system 412 will determine a lifestyle, event, experience, purpose, or theme associated with the product identifier 418 for a product collection. In some embodiments, the product database 416 is searched for product collections are share a same lifestyle, event, experience, purpose, or theme. In some embodiments, consumer information, such as a search or interaction history, can be used by the recommendation system 412 to infer a lifestyle, event, experience, purpose, or theme associated with the product data 408.

In some embodiments, the recommendation system 412 includes a product collections generation module 422. The product collections generation module 422 can generate one or more product collections according to one or more embodiments of the present disclosure. In one embodiment, generated product collections are transmitted to the product database 416 for storage.

In some embodiments, two or more products are automatically associated with a product collection using a combination of machine learning techniques and curation. As discussed previously herein, machine learning techniques can include supervised machine learning. In one embodiment, a dataset of products in the product database 412 may be labeled with known product collection associations to produce labeled data. The labeled data can then be used to generate a model for predicting product associations with product collections. In some embodiments, labeled data may be used to train a neural network to produce a first set of weighted coefficients. This first set of weighted coefficients can be used to generate estimated product collection associations. In some embodiments, the estimated product collection associations are compared against the actual product collection associations to determine a distance or an error associated with the estimated product collection associations. In some embodiments, the first set of weighted coefficients may be modified to produce a second set of weighted coefficients that reduces the distance or error. This process can be repeated over several generations to improve the predictive capabilities of the neural network. In some embodiments, the process may be repeated until a set of weighted coefficients is generated that provides a distance or error below a threshold. In some embodiments, the process may be repeated until an improvement in a distance or error between two successive generations is less than a threshold.

Figure 5:
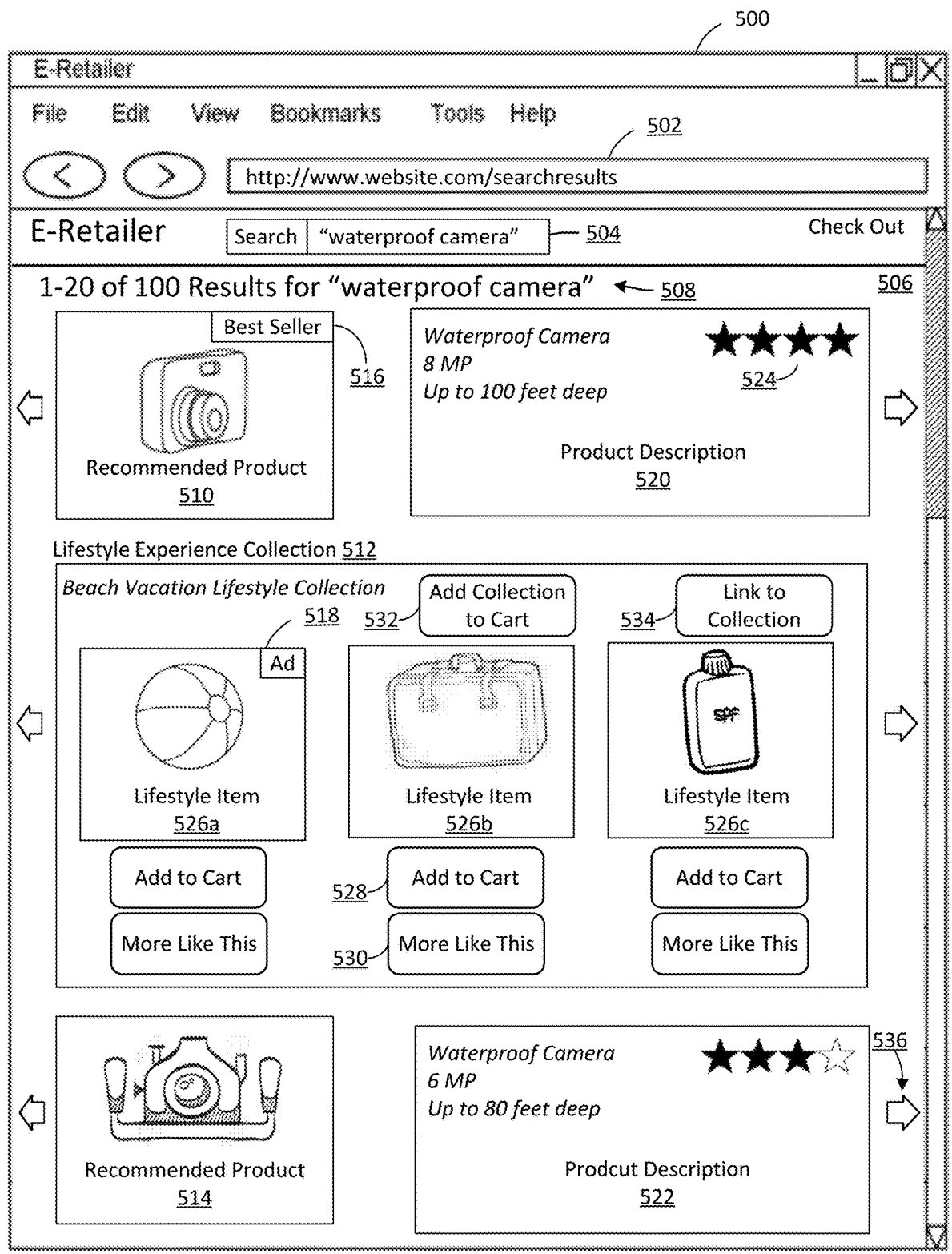
FIG. 5 is a schematic illustration of an example search results page for surfacing product collections in accordance with one or more example embodiments of the disclosure.

FIG. 5 depicts an example search results page 500 for surfacing a product collection as a search result in accordance with one or more example embodiments of the disclosure. While example embodiments of the disclosure may be described in the context of a search results page, it should be appreciated that the disclosure is more broadly applicable to all means of surfacing products to users. For example, product collections can be surfaced through a search interface, a browse interface, a shopping cart interface, an advertisement, a widget on an interface, a verbal or audio-based cue, or through any other interface or workflow used to surface traditional products to users.

As illustrated in FIG. 5, the search results page 500 includes a URL 502, a search widget 504, and a search results widget 506. In some embodiments, the search widget 504 may be used to navigate to a another search results page having one or more recommended products and product collections. In some embodiments, the search results page 500 may be displayed in response to a user search query.

The search results widget 506 includes a search results description 508. The search results description 508 can include, for example, a number of search result hits, a number of search results currently displayed on a user interface, a total number of search results, and a search query related to the search results.

In some embodiments, the search results widget 506 includes one or more recommended products and one or more recommended product collections. For example, the particular search results widget 506 in FIG. 5 may include a recommended product 510, a recommended product collection 512, and a recommended product 514.

In some embodiments, one or more of the recommended products or product collections includes a best seller widget 516 or an advertisement widget 518 for indicating whether the respective item is a best seller or an advertised product, respectively.

In some embodiments, one or more of the recommended products or product collections includes a product description, such as the product descriptions 520 and 522. The product descriptions can include an image, product details, a price, an availability, product reviews, and product ratings 524. For example, the search results widget 506 includes a recommended best seller product ("Waterproof Camera") having a product ratings 524 of four out of four stars. The product description 520, for example, also includes one or more features of the product ("8 MP" and "Up to 100 feet deep").

The recommended product collection 512 includes a description ("Beach Vacation Lifestyle Collection") and three products, the lifestyle items 526a, 526b, and 526c. In one embodiment, each of the lifestyle items 526a, 526b, and 526c and the recommended products 510 and 514 includes a widget 528 for adding the respective product to a cart and a widget 530 for directing a user to alternative products for the respective product.

In some embodiments, selection of the widget 530 results in the generation of a pop-up showing one or more alternative products. Selection of one of the alternative products may result in the original product being replaced with the alternative product. In some embodiments, selection of the widget 530 results in a navigation to a product detail page of the alternative product.

In some embodiments, the recommended product collection 512 also includes a widget 532 for adding the entire collection to a cart and a widget 534 for navigating to a product detail page of the recommended product collection 512 (e.g., the product detail page depicted in FIG. 3). In some embodiments, the search results widget 506 also includes a scroll widget 536 that, when selected, may show additional recommendations.

The particular recommended product collections shown through the search results widget 506 can be identified and surfaced according to one or more embodiments of the disclosure. In some embodiments, a remote system (such as the remote system 120 in FIG. 1) accesses a product recommendation database (such as the product recommendation database 124 in FIG. 1) to search for one or more product collections related to the a search query.

The one or more recommended products and one or more recommended product collections can be identified according to one or more embodiments of the present disclosure. In some embodiments, a product dataset (such as the product dataset 126 in FIG. 1) may be searched for any related products and product collections. In some embodiments, a remote system may determine a lifestyle, event, experience, purpose, or theme associated with the search query and product collections are surfaced that share a same lifestyle, event, experience, purpose, or theme. In some embodiments, user information, such as a search or purchase history, can be used by a remote system to infer a lifestyle, event, experience, purpose, or theme associated with the search query.

Figure 6:
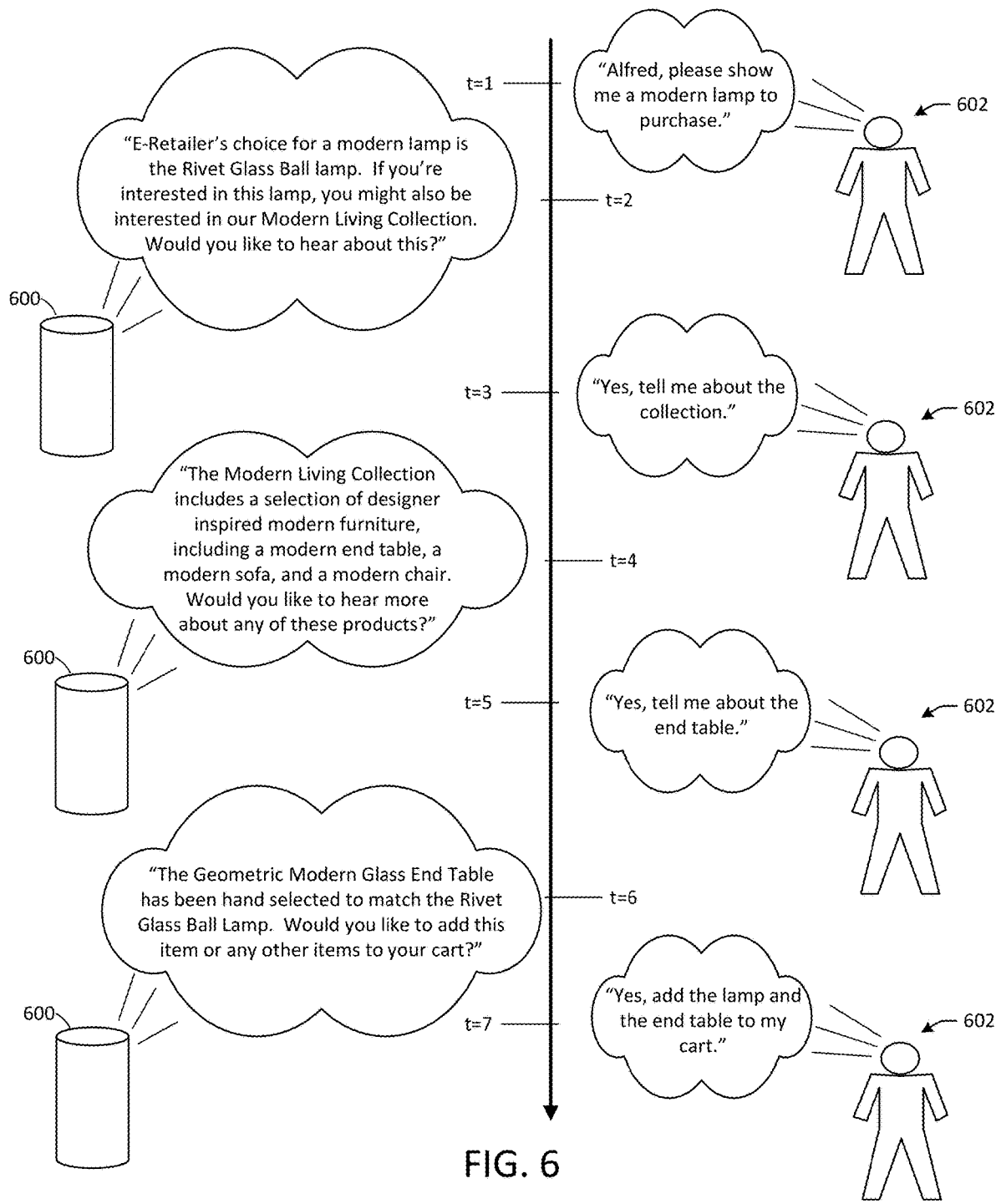
FIG. 6 is a schematic illustration of an example implementation for surfacing product collections based on an audible exchange in accordance with one or more example embodiments of the disclosure.

FIG. 6 is an example use case for surfacing a product collection based on an audible exchange with a user in accordance with one or more example embodiments of the disclosure.

As illustrated in FIG. 6, a user device 600 can be engaged by a user 602 through one or more interactions. In some embodiments, the user device 600 provides one or more product collection recommendations to the user 602 through these interactions. Interactions may include, for example, voice input, audio streams, gestures, and other interactions. The user device 600 can be any suitable system or device, and can include any suitable hardware, for these interactions. For example, the user device 600 can be a digital content provider, a wired or wireless consumer product, etc., and can include hardware, such as, for example, speakers, microphones, motion sensors, light sensors, audible user inputs, etc.

In one embodiment, the user 602 may initiate a voice input at the user device 600. The user may initiate a voice input by, for example, using a wake word, such as "Alfred," or by pressing or otherwise interacting with a physical button on the electronic device or a connected device, such as a remote control. In instances where a wake word is used to initiate a voice input, the device may detect the wake word and may initiate an audio stream or may otherwise initiate monitoring for sound using one or more microphones. Sound that is captured may be processed to determine a meaning of a user utterance or the voice input. In instances where a physical button is used to initiate a voice input, such as a "mic" button, the device may determine that that button was pressed or interacted with (e.g., tapped, pressed and held, etc.), or may receive a signal from a remote control or other connected device, and may initiate monitoring for sound using one or more microphones. While some interactions may be audio interactions, other embodiments may include physical interactions that may be initiated by voice (e.g., voice input of "Alfred, wake up," followed by a user touching a display, etc.).

As illustrated in FIG. 6, a user 602 interacts with a user device 600 over several rounds of conversation during which a product collection is surfaced. For example, at a first time ($t_1$) the user 602 uses a wake word and asks the user device 600 for a produce recommendation. As illustrated in FIG. 6, the user 602 states, "Yes, please show me a modern lamp to purchase."

At a second time ($t_2$), the user device 600 replies with a recommendation. In some embodiments, the recommendation includes a product collection recommendation according to one or more embodiments of the present disclosure. As illustrated in FIG. 6, the user device 600 states, "E-Retailer's choice for a modern lamp is the Rivet Glass Ball lamp. Would you like to buy it? If you're interested in this lamp, you might also be interested in our Modern Living Collection. Would you like to hear about this collection"?

At a third time ($t_3$) the user 602 agrees to hear about the product collection. As illustrated in FIG. 6, the user 602 states, "Yes, tell me about the collection."

At a fourth time ($t_4$), the user device 600 replies with a description of the product collection and one or more products of the product collection. As illustrated in FIG. 6, the user device 600 states, "The Modern Living Collection includes a selection of designer inspired matching modern furniture, including a modern end table, a modern sofa, and a modern chair. Would you like to hear more about any of these products"?

At a fifth time ($t_5$) the user 602 asks to hear about one of the products in the product collection. As illustrated in FIG. 6, the user 602 states, "Yes, tell me about the end table."

At a sixth time ($t_6$), the user device 600 replies with a description of the product. As illustrated in FIG. 6, the user device 600 states, "The Geometric Modern Glass End Table has been hand selected to match the Rivet Glass Ball Lamp. Would you like to add this item or any other items to your cart"?

At a seventh time ($t_7$) the user 602 adds a product from the recommended product collection. As illustrated in FIG. 6, the user 602 states, "Yes, add the lamp and the end table to my cart."

In some embodiments, a user may directly ask a user device for a product collection suggestion. In one embodiment, a user may ask a user device having voice-based communication capabilities for a product collection recommendation that uses or is otherwise associated with a particular product. For example, a user may ask a user device for a recipe that uses an artichoke. In response, the user device can provide one or more recipes (product collections) which use an artichoke. In one embodiment, a user may directly ask a user device for a product collection recommendation associated with a particular themed event. For example, a user may ask a user device for a product collection recommendation for an upcoming cocktail party or $50^{th}$ birthday party.

Figure 7A:
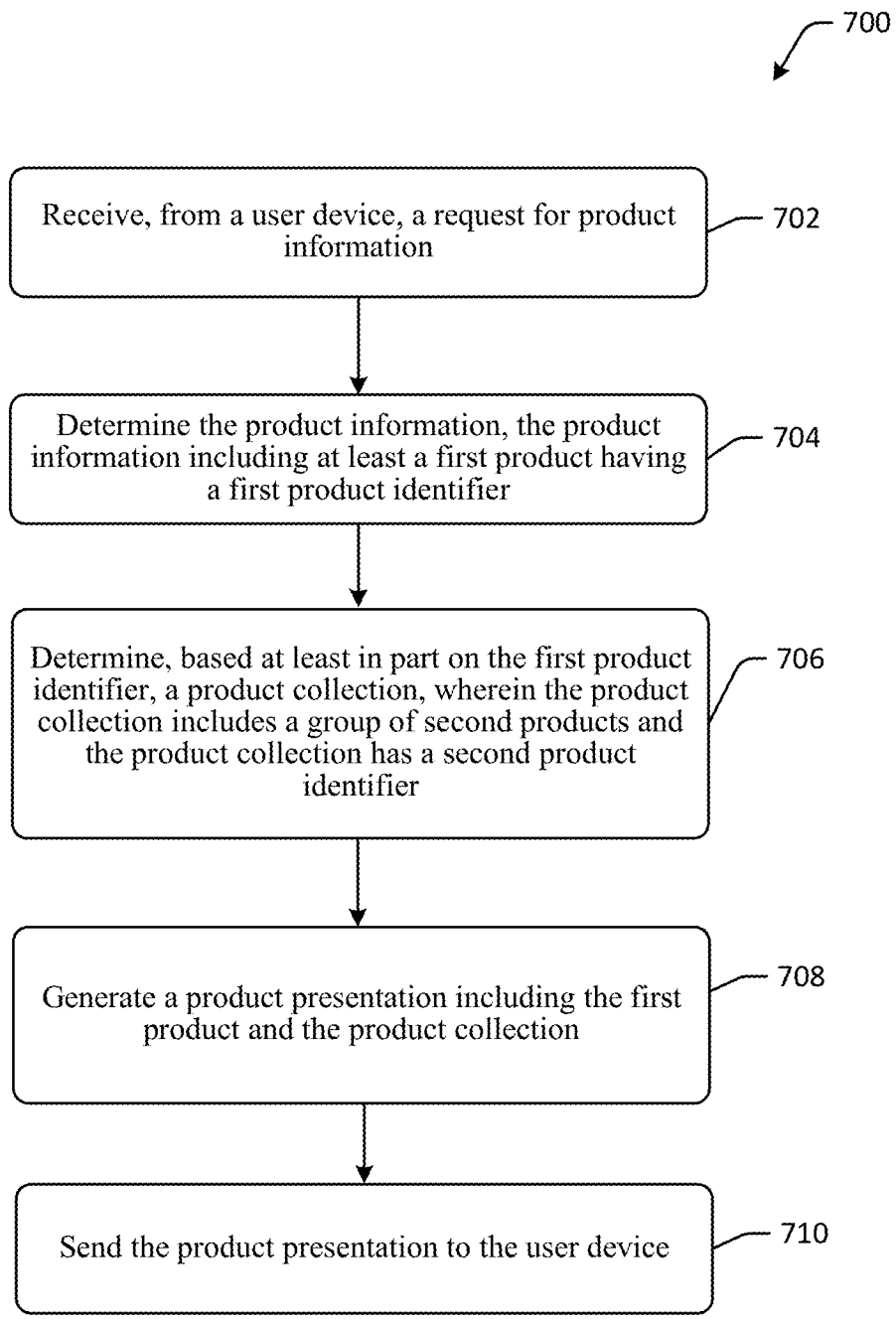
FIG. 7A is a schematic illustration of an example process flow in accordance with one or more example embodiments of the disclosure.

FIG. 7A schematically illustrates an example use case and an example process flow 700 for surfacing a product collection in accordance with one or more example embodiments of the disclosure. Some or all of the blocks of the process flow 700 may be performed in a distributed manner across any number of devices. The operations of the process flow 700 may be optional and may be performed in a different order.

At block 702, one or more computer processors coupled to at least one memory receive a search query from a user device. The search query can include a string of characters. In one embodiment, a user uses a user device to enter a search query into a search module of an online platform. At block 704, the one or more computer processors determine a search result including one or more products associated with the search query. At block 706, the one or more computer processors receive a selection of a first product of the one or more products from the user device. In some embodiments, the first product may be associated with a product identifier. At block 708, the one or more computer processors identify related products to the first product. In one embodiment, the related products include a product collection having multiple products grouped under a single product identifier. In some embodiments, the second product identifier differs from product identifiers of the respective second products in the group of second products.

At block 710, the one or more computer processor send, to the user device for presentation to a user, a product detail page of the first product. In some embodiments, the product detail page includes the related products.

Figure 7B:
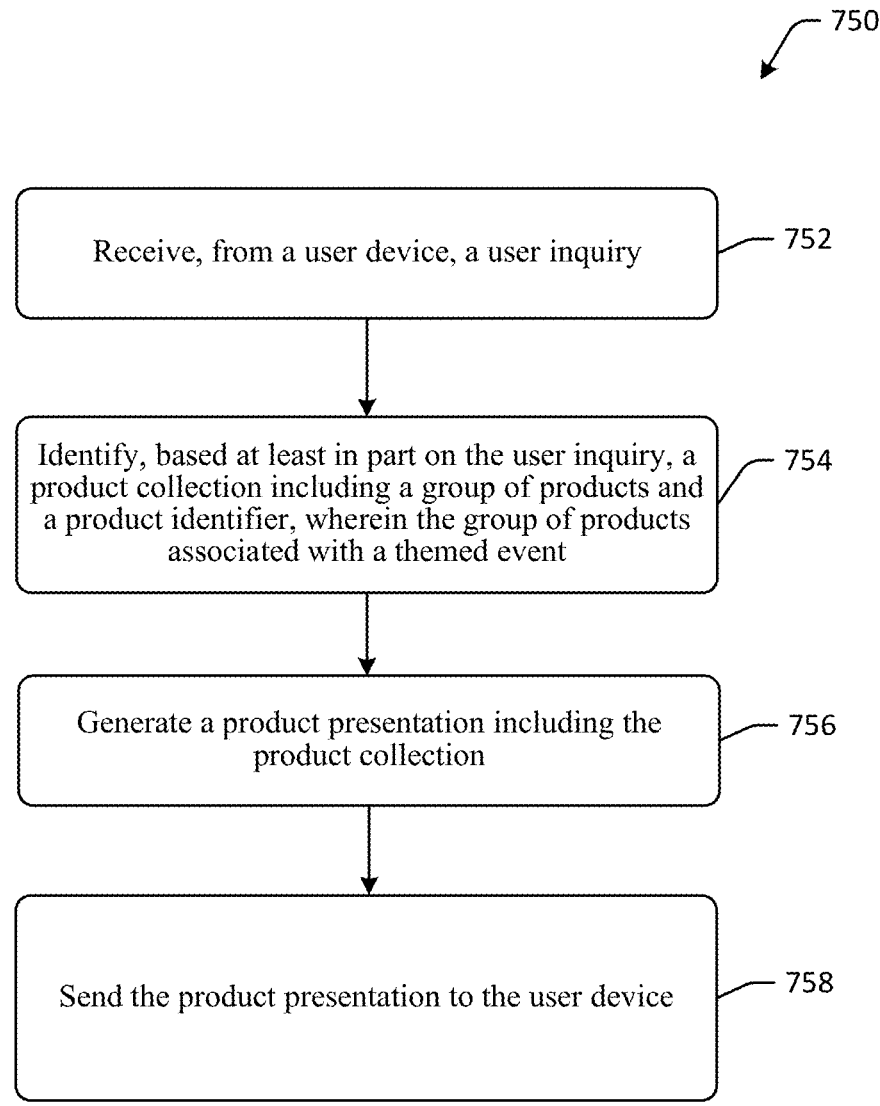
FIG. 7B is a schematic illustration of an example process flow in accordance with one or more example embodiments of the disclosure.

FIG. 7B schematically illustrates an example use case and an example process flow 750 for surfacing a product collection in accordance with one or more example embodiments of the disclosure. Some or all of the blocks of the process flow 750 may be performed in a distributed manner across any number of devices. The operations of the process flow 750 may be optional and may be performed in a different order.

At block 752, computer-executable instructions stored on a memory of a device, such as a remote server or a user device, may be executed to receive a user inquiry. In some embodiments, the user inquiry is a search term entered in a user interface. In some embodiments, the user inquiry is a verbal request for a product collection recommendation. In some embodiments, the user inquiry is an uploaded image of a product. The uploaded image may solicit a recommendation for one or more product collections associated with the image. In one embodiment, a user uses a user device to enter a user query into a search module of an online platform.

At block 754, computer-executable instructions stored on a memory of a device, such as a remote server or a user device, may be executed to identify, based at least in part on the user inquiry, a product collection. In some embodiments, the product collection includes two or more products grouped under a single product identifier. At block 756, computer-executable instructions stored on a memory of a device, such as a remote server or a user device, may be executed to receive a selection of the product collection. At block 758, computer-executable instructions stored on a memory of a device, such as a remote server or a user device, may be executed to generate a product detail page of the product collection. In one embodiment, the product detail page includes the two or more products.

Figure 8:
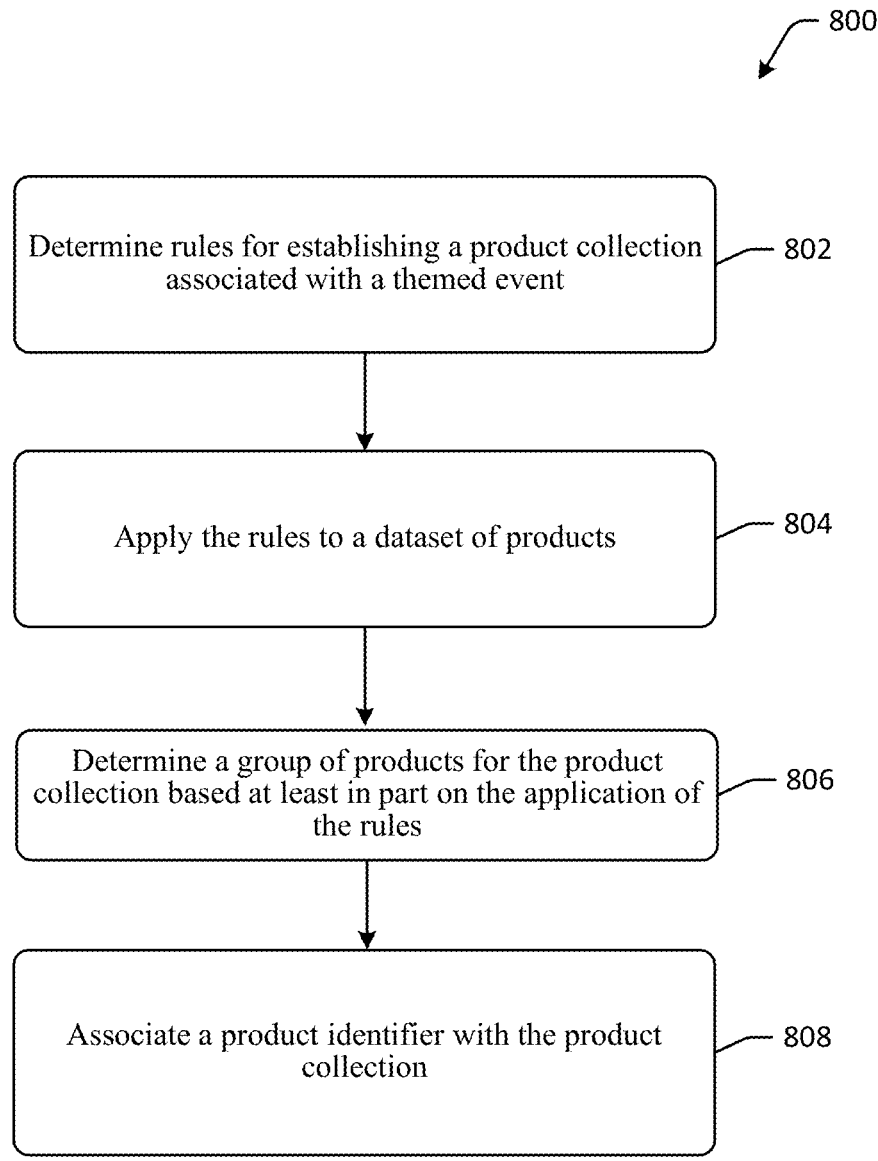
FIG. 8 is a schematic illustration of an example process flow for generating product collections in accordance with one or more example embodiments of the disclosure.

FIG. 8 schematically illustrates an example use case and an example process flow 800 for generating a product collection in accordance with one or more example embodiments of the disclosure. Some or all of the blocks of the process flow 800 may be performed in a distributed manner across any number of devices. The operations of the process flow 800 may be optional and may be performed in a different order.

At block 802, computer-executable instructions stored on a memory of a device, such as a remote server or a user device, may be executed to determine rules for establishing a product collection associated with a themed event. In some embodiments, the rules may define one or more conditions that, if satisfied, may trigger the association of one or more products with a product collection. These conditions can leverage known relationships among the one or more products as they relate to one or more themed events. These product relationships can be empirically discovered through marketplace analytics, transactional data, surveys, by tracking product purchases, by tracking conversion metrics, such as periods of time during which when one or more products are likely to be purchased, user actions prior to or after a purchase, etc. User actions can include clicking a product, navigating to a product detail page, browsing one or more products, adding a product to a cart or wish list, or any other user interaction, such as an interaction with a user interface of the online platform. For example, if a chair and a rug are known to be purchased together in more than 20 percent of all shopping carts, the chair and the rug can be associated with a same product collection.

At block 804, the rules are applied to a dataset of products. In one embodiment, the dataset of products includes some or all of the products offered by an online platform. At block 806, a group of products for the product collection may be determined based at least in part on the application of the rules. For example, a group of products including a shirt, a baseball bat, a glove, cleats, and a baseball can be determined and assigned to a product collection based at least in part on transactional data showing that these items are commonly purchased together.

At block 808, a unique product identifier may be associated with the product collection. In one embodiment, this unique product identifier differs from the product identifiers of any of the respective products in product collection.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art may recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

ILLUSTRATIVE DEVICE ARCHITECTURE

FIG. 9 is a schematic block diagram of an illustrative remote server 900 in accordance with one or more example embodiments of the disclosure. The remote server 900 may include any suitable computing device capable of receiving and/or generating data including, but not limited to, a mobile device such as a smartphone, tablet, e-reader, wearable device, or the like; a desktop computer; a laptop computer; a content streaming device; a set-top box; a user device (e.g., the user device 102 of FIG. 1), a remote system (e.g., the remote system 120 of FIG. 1), or a server (e.g., the server 402 of FIG. 4) or the like. The remote server 900 may correspond to an illustrative device configuration for the devices of FIGS. 1-8.

The remote server 900 may be configured to communicate via one or more networks with one or more servers, search engines, user devices, or the like. In some embodiments, a single remote server or single group of remote servers may be configured to perform product collection generation, product collection surfacing, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 900 may include one or more processors (processor(s)) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and data storage 920. The remote server 900 may further include one or more buses 918 that functionally couple various components of the remote server 900. The remote server 900 may further include one or more antenna(e) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the remote server 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the remote server 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like such as, for example, one or more product collection generation module(s) 926, one or more communication module(s) 928, one or more product collection surfacing module(s) 930, and one or more product recommendation module(s) 932. Some or all of these module(s) may be sub-module(s). Any of the components depicted as being stored in data storage 920 may include any combination of software, firmware, and/or hardware. The software and/or firmware may include computer-executable code, instructions, or the like that may be loaded into the memory device(s) 904 for execution by one or more of the processor(s) 902. Any of the components depicted as being stored in data storage 920 may support functionality described in reference to correspondingly named components earlier in this disclosure.

The data storage 920 may further store various types of data utilized by components of the remote server 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, threat intelligence data, whitelisted entity data, user account information, user profile information, machine learning models, historical accuracy data, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the remote server 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the product collection generation module(s) 926 may include computer-executable instructions, code, or the like that responsive to execution by one or more of the processor(s) 902 may perform functions including, but not limited to, determining training data sets, determining model accuracy and/or confidence scores, comparing various features of a data set to a set of one or more aggregated data points, generating one or more machine learning models or algorithms, generating one or more product collections having two or more products grouped under a single product identifier, and surfacing the one or more product collections to various users and user devices.

The communication module(s) 928 may include computer-executable instructions, code, or the like that responsive to execution by one or more of the processor(s) 902 may perform functions including, but not limited to, communicating with one or more devices, for example, via wired or wireless communication, communicating with remote servers, communicating with remote datastores, sending or receiving notifications or alerts, communicating with cache memory data, and the like.

The product collection surfacing module(s) 930 may include computer-executable instructions, code, or the like that responsive to execution by one or more of the processor(s) 902 may perform functions including, but not limited to, receiving search queries, determining search results including one or more products associated with the search query, receiving a selection of a first product of the one or more products from the user device, identifying related products to the first product, and sending a product detail page of the first product and the related products to a user device, and the like.

Referring now to other illustrative components depicted as being stored in the data storage 920, the O/S 922 may be loaded from the data storage 920 into the memory 904 and may provide an interface between other application software executing on the remote server 900 and hardware resources of the remote server 900. More specifically, the O/S 922 may include a set of computer-executable instructions for managing hardware resources of the remote server 900 and for providing common services to other application programs (e.g., managing memory allocation among various application programs). In certain example embodiments, the O/S 922 may control execution of the other program module(s) to dynamically enhance characters for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 1004 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 900 is a mobile device, the DBMS 924 may be any suitable light-weight DBMS optimized for performance on a mobile device.

Referring now to other illustrative components of the remote server 900, the input/output (I/O) interface(s) 906 may facilitate the receipt of input information by the remote server 900 from one or more I/O devices as well as the output of information from the remote server 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 934 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3 G network, ZigBee network, etc.

The remote server 900 may further include one or more network interface(s) 908 via which the remote server 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna(e) 934 may include any suitable type of antenna depending, for example, on the communications protocols used to transmit or receive signals via the antenna (e) 934. Non-limiting examples of suitable antennas may include directional antennas, non-directional antennas, dipole antennas, folded dipole antennas, patch antennas, multiple-input multiple-output (MIMO) antennas, or the like. The antenna(e) 934 may be communicatively coupled to one or more transceivers 912 or radio components to which or from which signals may be transmitted or received.

As previously described, the antenna(e) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 934 may additionally, or alternatively, include a Wi-Fi antenna configured to transmit or receive signals in accordance with established standards and protocols, such as the IEEE 752.11 family of standards, including via 2.4 GHz channels (e.g., 752.11b, 752.11g, 752.11n), 5 GHz channels (e.g., 752.11n, 752.11ac), or 60 GHz channels (e.g., 752.11ad). In alternative example embodiments, the antenna(e) 934 may be configured to transmit or receive radio frequency signals within any suitable frequency range forming part of the unlicensed portion of the radio spectrum.

The antenna(e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 934—transmitting or receiving radio frequency (RF) signals in the bandwidth and/or channels corresponding to the communications protocols utilized by the remote server 900 to communicate with other devices. The transceiver(s) 912 may include hardware, software, and/or firmware for modulating, transmitting, or receiving—potentially in cooperation with any of antenna(e) 934—communications signals according to any of the communications protocols discussed above including, but not limited to, one or more Wi-Fi and/or Wi-Fi direct protocols, as standardized by the IEEE 752.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the remote server 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the remote server 900 may include alternate and/or additional hardware, software, or firmware components beyond those described or depicted without departing from the scope of the disclosure. More particularly, it should be appreciated that software, firmware, or hardware components depicted as forming part of the remote server 900 are merely illustrative and that some components may not be present or additional components may be provided in various embodiments. While various illustrative program module(s) have been depicted and described as software module(s) stored in data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to at least one memory, a search query from a user device;
determining, by the one or more computer processors, search results comprising one or more products associated with the search query;
sending, by the one or more computer processors, the search results to the user device;
receiving, by the one or more computer processors, an indication of a selection of a first product of the one or more products from the user device, the first product having a first product identifier;
identifying, by the one or more computer processors, based at least in part on the first product identifier, a first product collection, the first product collection having a first product collection identifier and including a first group of products associated with a themed event, wherein the first product collection identifier differs from product identifiers of respective products in the first group of products, wherein determining the first product collection comprises:
  determining a second product collection, wherein the second product collection includes a second group of products associated with the themed event, wherein the themed event is associated with the selection of the first product;
  automatically determining a second product to combine with the second group of products, wherein the second product and the second group of products are related by the themed event; and
  determining the first product collection using the second product and the second group of products, wherein the first product collection is associated with the themed event;
generating, by the one or more computer processors, a product detail page for the first product, the product detail page including the first product collection; and
sending, by the one or more computer processors, to the user device, the product detail page.

2. The method of claim 1, further comprising:
receiving, by the one or more computer processors, from the user device, an indication of a selection of the first product collection;
generating, by the one or more computer processors, a product collection detail page for the first product collection, the product collection detail page including product information for at least a third product in the first group of products; and
sending, by the one or more computer processors to the user device, the product detail page for the first product collection.

3. The method of claim 2, wherein the product detail page of the first product collection further comprises:
replacing, by the one or more computer processors, the third product in the first product collection with a fourth product based at least in part on a number of product views of the third product or a number of product views of the fourth product.

4. The method of claim 1, further comprising:
determining rules for creating the first product collection associated with the themed event;
applying, by the one or more computer processors, the rules to a dataset of products;
determining, by the one or more computer processors, the first group of products for the first product collection, wherein the first group of products comprises a third product and a fourth product associated with the themed event, wherein the third product comprises a first product type and the fourth product comprises a second product type; and
assigning the first product collection identifier to the first product collection.

5. A method comprising:
receiving, by one or more computer processors coupled to memory, from a user device, a request for product information;
determining, by the one or more computer processors, the product information, the product information including at least a first product having a first product identifier;
determining, by the one or more computer processors, based at least in part on the first product identifier, a first product collection, wherein the first product collection includes a first group of products, and wherein the first product collection has a first product collection identifier, wherein determining the first product collection comprises:
  determining a second product collection, wherein the second product collection includes a second group of products associated with a themed event, wherein the themed event is associated with the product information;
  automatically determining a second product to combine with the second group of products, wherein the second product and the second group of products are related by the themed event; and
  determining the first product collection using the second product and the second group of products, wherein the first product collection is associated with the themed event;
generating, by the one or more computer processors, a product presentation including the first product collection; and
sending, by the one or more computer processors coupled to, the product presentation to the user device.

6. The method of claim 5, further comprising:
receiving, by the one or more computer processors, an indication of a selection of the first product collection;
generating a product detail presentation for the first product collection; and
sending, by one or more computer processors, the product detail presentation to the user device.

7. The method of claim 6, wherein the product detail presentation for the first product collection includes the first group of products.

8. The method of claim 5, wherein generating the first product collection further comprises:
determining rules for establishing a collection of products associated with the themed event;
applying the rules to a dataset of products;
determining the first group of products of the first product collection based at least in part on the application of the rules; and
associating the first product collection identifier with the first product collection.

9. The method of claim 8, further comprising at least one of removing the second product from the first product collection, or adding a third product to the first product collection.

10. The method of claim 8, wherein determining the first group of products further comprises determining the first product collection after a curation of the first group of products.

11. The method of claim 10, wherein the curation of the first group of products comprises determining the first group of products from a third group of products.

12. The method of claim 5, wherein determining the first product collection includes determining that the first product identifier is associated with the first product collection identifier.

13. The method of claim 5, wherein the themed event is a first themed event, and wherein determining the first product collection includes:
- determining a second themed event associated with the first product identifier; and
- determining one or more product collections associated with the second themed event.

14. The method of claim 5, further comprising:
- generating a personalized version of the first product collection; and
- associating the personalized version of the first product collection with a user account.

15. The method of claim 5, further comprising adding, removing, or replacing a product of the first group of products in the first product collection based at least in part on a likelihood that a user interaction with a first product of the first group of products after a user interaction with a second product of the first group of products is greater than a threshold.

16. A device comprising:
- at least one memory that stores computer-executable instructions; and
- at least one processor configured to access the memory and execute the computer-executable instructions to:
  - receive, from a user device, a user inquiry;
  - identify, based at least in part on the user inquiry, a first product collection, the first product collection including a first group of products and having a first product collection identifier, wherein the first group of products are associated with a themed event, wherein determining the first product collection comprises:
    - determining a second product collection, wherein the second product collection includes a second group of products associated with the themed event, wherein the themed event is associated with the user inquiry;
    - automatically determining a second product to combine with the second group of products, wherein the second product and the second group of products are related by the themed event; and
    - determining the first product collection using the second product and the second group of products, wherein the first product collection is associated with the themed event;
  - generate a product presentation including the first product collection; and send the product presentation to the user device.

17. The device of claim 16, wherein the at least one processor is further configured to replace a first product in the first product collection with a third product based at least in part on a number of product views of the first product or a number of product views of the third product.

18. The device of claim 16, wherein the at least one processor is further configured to:
- determine the themed event associated with the user inquiry; and
- search a database for one or more product collections associated with the themed event of the user inquiry.

19. The device of claim 16, wherein the at least one processor is further configured to:
- generate a personalized version of the first product collection; and
- associate the personalized version of the first product collection with a user account.

20. The device of claim 16, wherein the at least one processor is further configured to:
- label a set of products with known product collection associations to produce labeled data;
- train a neural network with the labeled data to produce a first set of weighted coefficients;
- generate estimated product collection associations based at least in part on the first set of weighted coefficients;
- determine an error associated with the estimated product collection associations; and
- modify the first set of weighted coefficients to produce a second set of weighted coefficients that reduce the error.

* * * * *